(12) United States Patent
Carlock

(10) Patent No.: US 10,277,343 B2
(45) Date of Patent: Apr. 30, 2019

(54) GUIDE GENERATION FOR MUSIC-RELATED CONTENT IN A BROADCAST RADIO ENVIRONMENT

(71) Applicant: iBiquity Digital Corporation, Columbia, MD (US)

(72) Inventor: Jason Carlock, Rochester Hills, MI (US)

(73) Assignee: Ibiquity Digital Corporation, Columbia, MD (US)

( * ) Notice: Subject to any disclaimer, the term of this patent is extended or adjusted under 35 U.S.C. 154(b) by 0 days.

(21) Appl. No.: 15/483,226

(22) Filed: Apr. 10, 2017

(65) Prior Publication Data

US 2018/0294906 A1 Oct. 11, 2018

(51) Int. Cl.
*G06F 17/00* (2006.01)
*H04H 60/37* (2008.01)
(Continued)

(52) U.S. Cl.
CPC .............. *H04H 60/37* (2013.01); *G06F 3/16* (2013.01); *G06F 17/30026* (2013.01); *G06F 17/30743* (2013.01); *G06F 17/30752* (2013.01); *G06F 17/30772* (2013.01); *G06F 17/30775* (2013.01); *G06F 17/30778* (2013.01); *H04H 20/12* (2013.01); *H04H 20/57* (2013.01); *H04H 2201/18* (2013.01)

(58) Field of Classification Search
CPC ......... G06F 17/30026; G06F 17/30017; G06F 17/30743; G06F 17/30047; G06F 3/16; H04H 60/37; H04H 60/38; H04H 60/43; H04H 60/44; H04H 60/58; H04H 60/74
See application file for complete search history.

(56) References Cited

U.S. PATENT DOCUMENTS 7,028,082 B1 * 4/2006 Rosenberg ............. H04H 60/02
707/999.104
7,231,176 B2 6/2007 Levy
(Continued)

OTHER PUBLICATIONS

"International Application Serial No. PCT/US2018/026700, International Search Report dated May 7, 2018", 3 pgs.
(Continued)

*Primary Examiner* — Andrew C Flanders
(74) *Attorney, Agent, or Firm* — Schwegman Lundberg & Wessner, P.A.

(57) ABSTRACT

Tools and techniques are provided for identifying, collecting, and processing music-related content within a radio broadcast environment. In one embodiment, a method is provided for processing music-related broadcast radio data. The method includes receiving a plurality of broadcast radio station signals; identifying each radio station signal as an analog signal or a digitally broadcast signal in response to the identified radio station signals; obtaining a broadcast sample from at least one of the radio stations; identifying at least one music-related information element missing from the broadcast sample; obtaining missing music-related information elements; updating a computer server with the obtained music-related information elements; and generating and communicating a music guide including the updated information to various user devices.

20 Claims, 6 Drawing Sheets

(51) Int. Cl.
  *H04H 20/12* (2008.01)
  *H04H 20/57* (2008.01)
  *G06F 17/30* (2006.01)
  *G06F 3/16* (2006.01)

(56) References Cited

U.S. PATENT DOCUMENTS

| | | | |
|---|---|---|---|
| 8,180,277 B2 | 5/2012 | Srinivasan et al. | |
| 8,521,079 B2 | 8/2013 | Burke et al. | |
| 8,639,178 B2 | 1/2014 | Anniballi et al. | |
| 9,026,546 B2 | 5/2015 | Emerson, III | |
| 9,330,647 B1 | 5/2016 | Bay et al. | |
| 9,407,383 B2 | 8/2016 | Milbar et al. | |
| 9,418,669 B2 | 8/2016 | Emerson, III | |
| 2003/0012403 A1* | 1/2003 | Rhoads | G06F 17/30026 382/100 |
| 2004/0036811 A1* | 2/2004 | Ikeguchi | H04N 5/50 348/732 |
| 2006/0026643 A1* | 2/2006 | Silverberg | H04N 5/44543 725/46 |
| 2007/0143816 A1* | 6/2007 | Gupta | H04H 60/46 725/135 |
| 2008/0082510 A1* | 4/2008 | Wang | H04H 60/37 |
| 2008/0126109 A1* | 5/2008 | Cragun | G06Q 30/0603 709/223 |
| 2009/0163137 A1* | 6/2009 | Capparelli | H04H 60/06 455/3.06 |
| 2010/0279629 A1* | 11/2010 | Srinivasan | H04B 1/034 455/74 |
| 2012/0254234 A1* | 10/2012 | LaJoie | G06F 17/30775 707/769 |
| 2014/0056433 A1 | 2/2014 | Emerson, III | |
| 2014/0335834 A1 | 11/2014 | Emerson, III | |
| 2014/0336797 A1 | 11/2014 | Emerson, III | |
| 2014/0336799 A1 | 11/2014 | Emerson, III | |
| 2015/0106394 A1 | 4/2015 | Otto et al. | |
| 2016/0182192 A1* | 6/2016 | Milbar | H04L 1/08 714/748 |

OTHER PUBLICATIONS

"International Application Serial No. PCT/US2018/026700, Written Opinion dated May 7, 2018", 7 pgs.

* cited by examiner

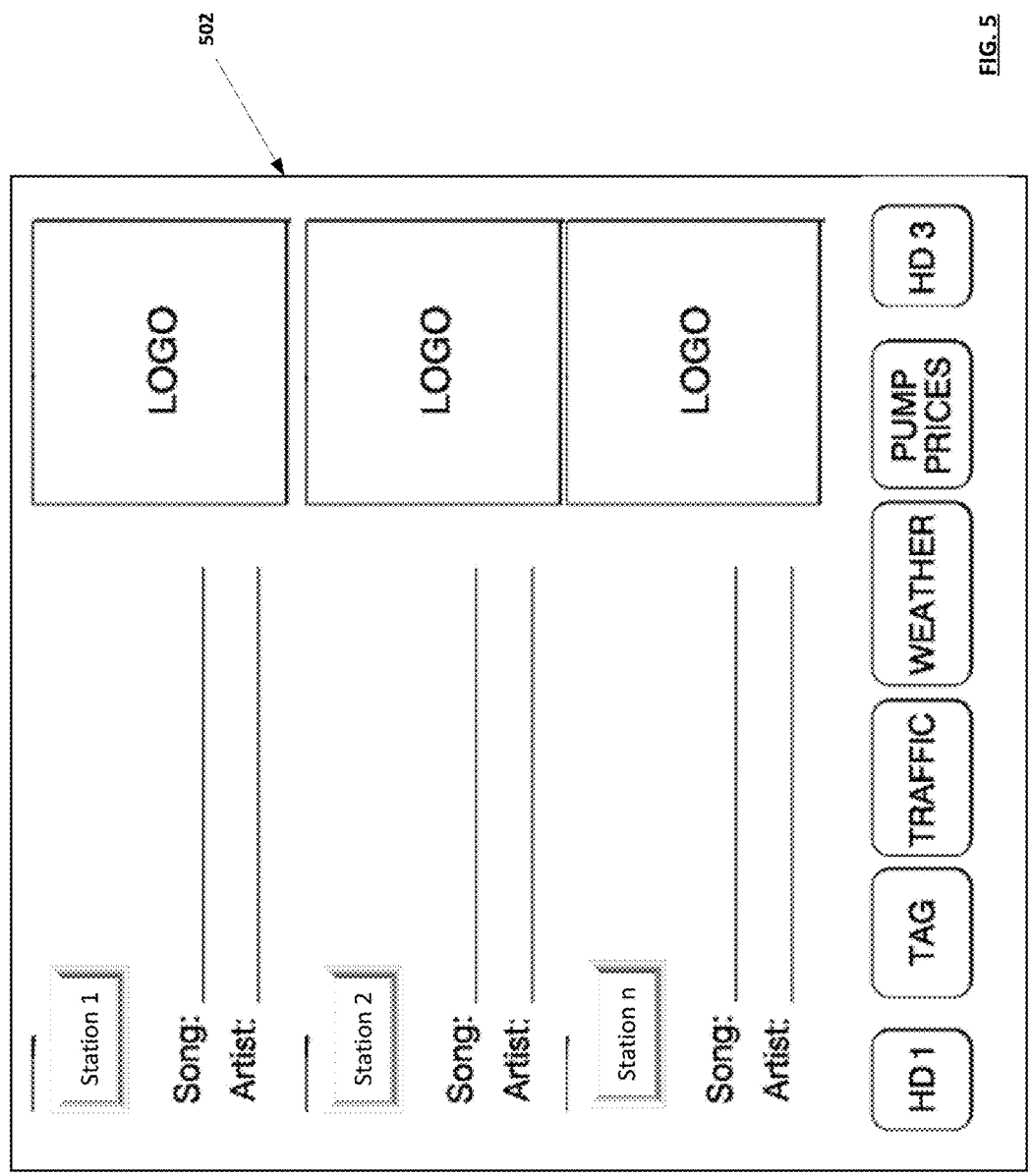

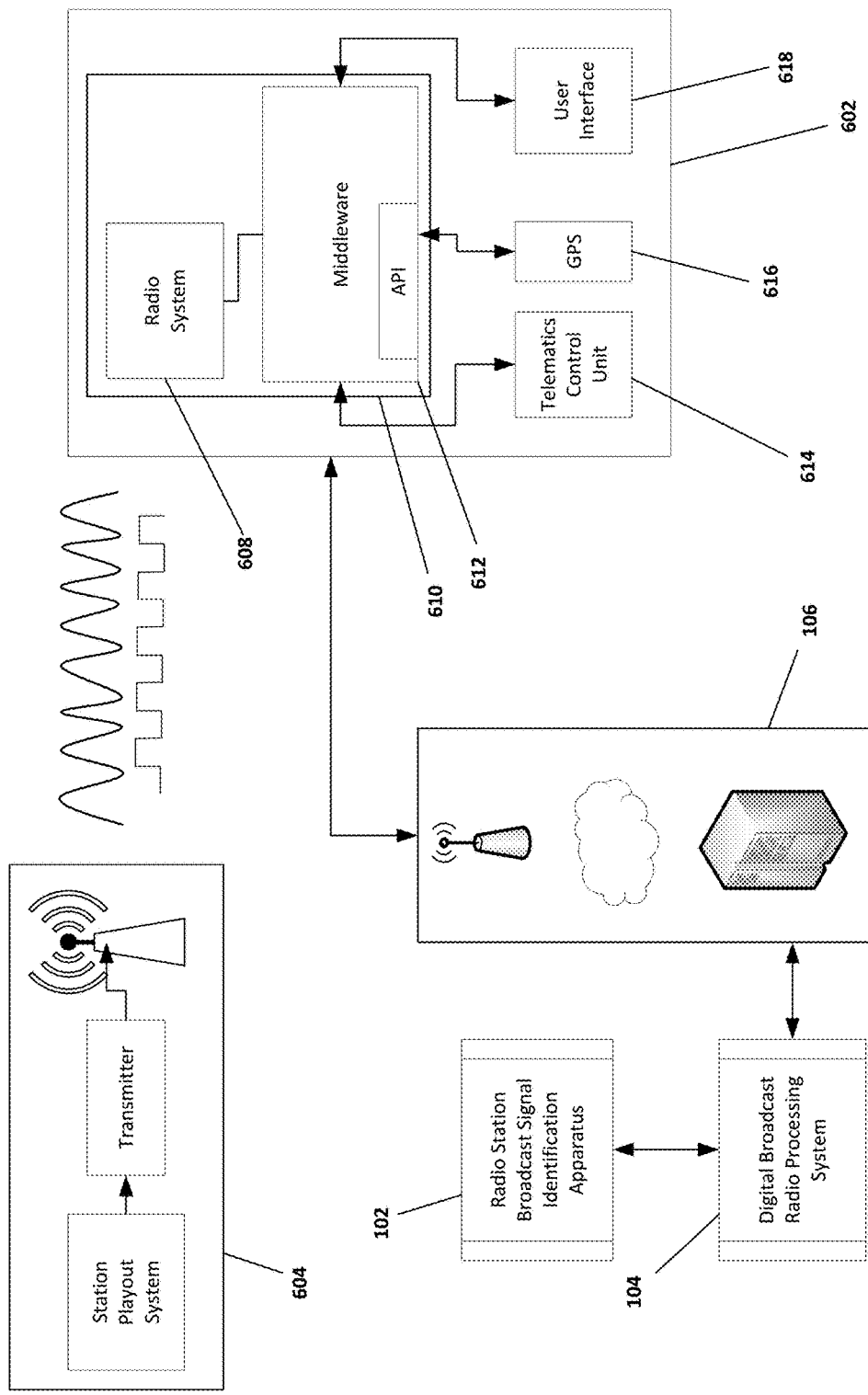

GUIDE GENERATION FOR MUSIC-RELATED CONTENT IN A BROADCAST RADIO ENVIRONMENT

FIELD OF INVENTION

In various embodiments, the present invention generally relates to identifying, collecting, and processing music-related content within a radio broadcast environment.

BACKGROUND

In-band on-channel ("IBOC") digital radio technology can be used by AM (amplitude modulated) and FM (frequency modulated) radio stations to transmit audio and other data. IBOC is a hybrid method for simultaneously broadcasting digital radio and analog radio in the same frequency band by placing additional digital subcarriers in the sidebands of the AM or FM channel. Such hybrid radio technology allows a single radio station to simultaneously broadcast one or more different programs in addition to an initial program transmitted on the radio station's analog channel.

The trade-designated "HD Radio" system is one example of broadcast radio technology designed to permit a smooth evolution from analog amplitude modulation (AM) and frequency modulation (FM) broadcast radio signals to a fully digital in-band on-channel (IBOC) system. This system delivers digital audio and data services to mobile, portable, and fixed receivers. Broadcasters can continue to transmit analog AM and FM simultaneously with higher quality and more robust digital signals, coupled with allowing conversion from analog to digital radio while maintaining current frequency allocations.

The National Radio Systems Committee, a standard-setting organization sponsored by the National Association of Broadcasters and the Consumer Electronics Association, adopted an IBOC standard, designated NRSC-5, which sets forth the requirements for broadcasting digital audio and ancillary data over AM and FM broadcast channels. The standard and its reference documents contain detailed explanations of the RF/transmission subsystem and the transport and service multiplex subsystems. The "HD Radio" broadcast radio technology is an implementation of the NRSC-5 IBOC standard.

For users of digital radio technology, it can often be difficult to obtain a complete inventory of the music-related content that might be available in a given area or market of interest (e.g., geographic area) at a particular time. For example, analog radio stations which are not digitally broadcasting may broadcast programming for which certain elements such as artist name, song title, album title, or album artwork cannot be readily identified or determined. As a result, such missing elements cannot be properly displayed to users. Many currently available hybrid radio products provide inadequate coverage in many markets, because of these "holes" in the system. It would be advantageous to address these information gaps so that a more complete picture of the music-related content available in a given area of interest can be presented to consumers.

What are needed, therefore, are enhanced tools and techniques for processing music-related broadcast radio signals in a given area of interest to identify and address missing information elements in music-related content.

SUMMARY

In various embodiments of the invention, enhanced tools and techniques are provided for processing music-related broadcast radio signals to identify and address missing information elements in music-related content. The processing involved with these tools and techniques can be leveraged to generate music-related content guides such as music guides for a given area of interest.

In one embodiment, a method is provided for processing music-related broadcast radio data. The method includes receiving, with multiple tuners, a plurality of broadcast radio station signals each at a predetermined frequency and a threshold signal level; identifying each radio station signal as an analog signal or a digitally broadcast signal in response to the identified radio station signals; obtaining a broadcast sample from at least one of the radio stations; identifying at least one music-related information element missing from the broadcast sample; obtaining at least one of the missing music-related information elements from at least one data external source; and, updating a data storage medium of a computer system with the obtained music-related information elements. The music-related information may include at least one of an artist name, a song title, an album title, or an image In certain embodiments, the method may include generating a music guide in response to at least a portion of the obtained music-related information elements. The generated music guide may be communicated to at least one user access device. The obtained music-related information may be compiled in response to the selected area of interest, and the music guide may be generated in response to the compiled music-related information. The method may include selecting a radio broadcast area of interest and receiving the plurality of broadcast radio station signals identified within the selected area of interest.

Apparatus and system embodiments implementing the method and process aspects of the invention are also described herein.

BRIEF DESCRIPTION OF FIGURES

FIG. 5 is an example of a screen that may be presented on a graphical user interface for a radio system or an Internet player in connection with certain embodiments of the invention.

FIG. 6 is a schematic diagram illustrating one example of a system architecture configured for delivering content to a radio system installed in a vehicle.

DETAILED DESCRIPTION

In developing various embodiments of the present invention, the inventor has discovered that it can be challenging to achieve a complete understanding of the music-related content that might be available in a given broadcast radio area or market of interest (e.g., geographic area or frequency range). For example, all or a portion of certain music-related information elements such as artist name, song title, album title, album artwork, images, or other data cannot be readily identified or determined at various times and in various areas of interest. Accordingly, various tools and techniques offered by the invention can be configured and programmed to address these music-related information deficiencies or missing data elements and to generate a more complete list or guide representing music-related content available in a given area of interest. Those skilled in the art will appreciate that the processes, tools, and techniques described herein provide a way to identify various parts of music-related content a single time but for multiple users. In certain embodiments, certain aspects of music-related content may only need to be fingerprinted or downloaded one time, instead of needing to be identified or downloaded multiple times at each client device or on the receiver side of a system architecture.

Various embodiments of the present invention can be used in connection with IBOC digital radio technology or other hybrid methods for simultaneously broadcasting digital radio and analog radio. For example, the trade-designated "HD Radio" system can be used in connection with tools, techniques, processes, and apparatuses described herein. Alternatively, embodiments of the invention can be employed with other digital broadcast radio standards. For example, certain areas of the world have implemented Eureka-147 Digital Audio Broadcasting ("DAB"). Another example is Digital Radio Mondiale ("DRM 30"), which is a system designed primarily for shortwave radio communications. In another example, CDR, is a digital radio broadcasting standard and a type of IBOC system that operates in the FM band (e.g., 87 MHz to 108 MHz).

Figure 1:
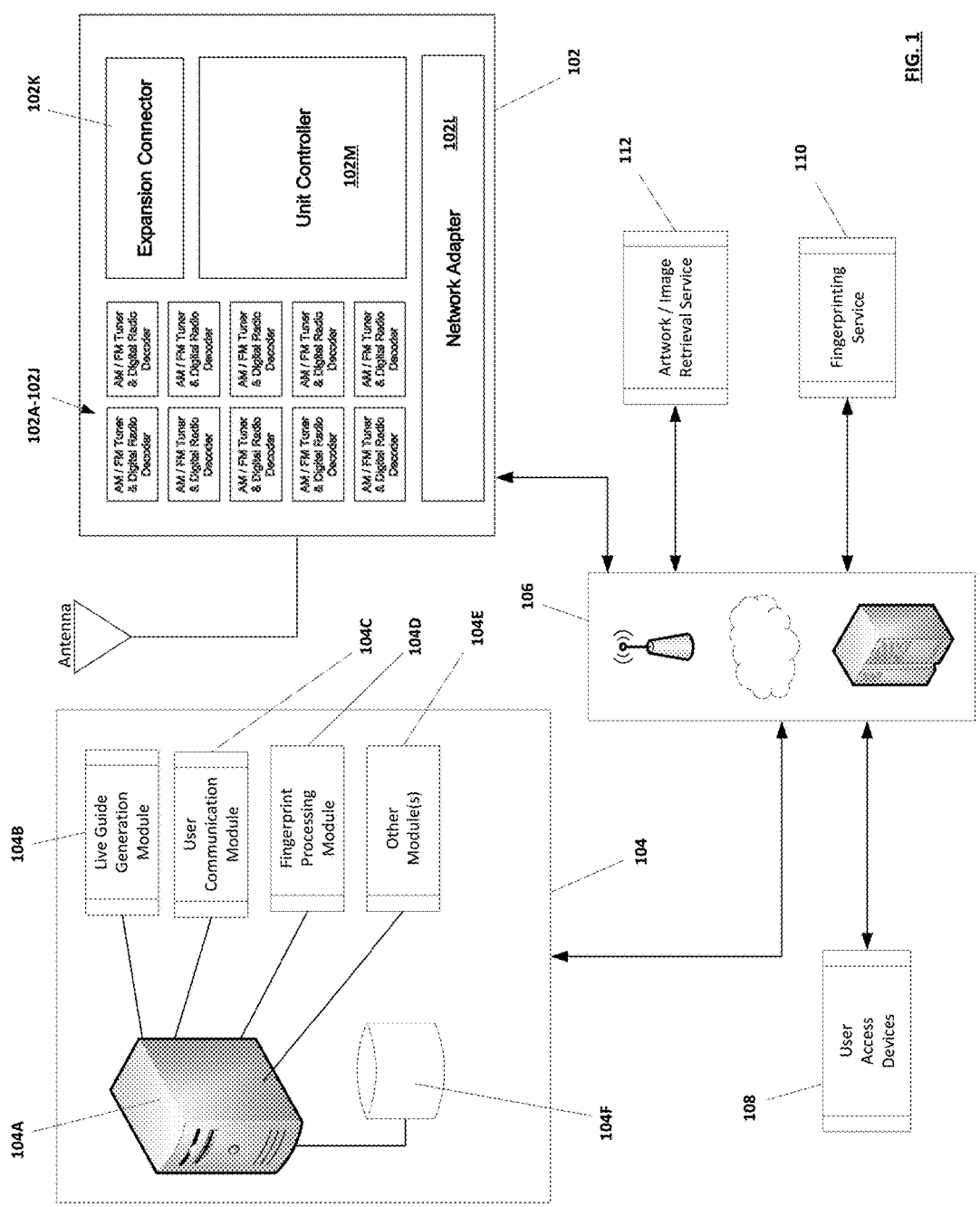
FIG. 1 is a block diagram illustrating an example of a radio station broadcast signal identification apparatus in operative association with a digital broadcast radio processing system.
Figure 2:
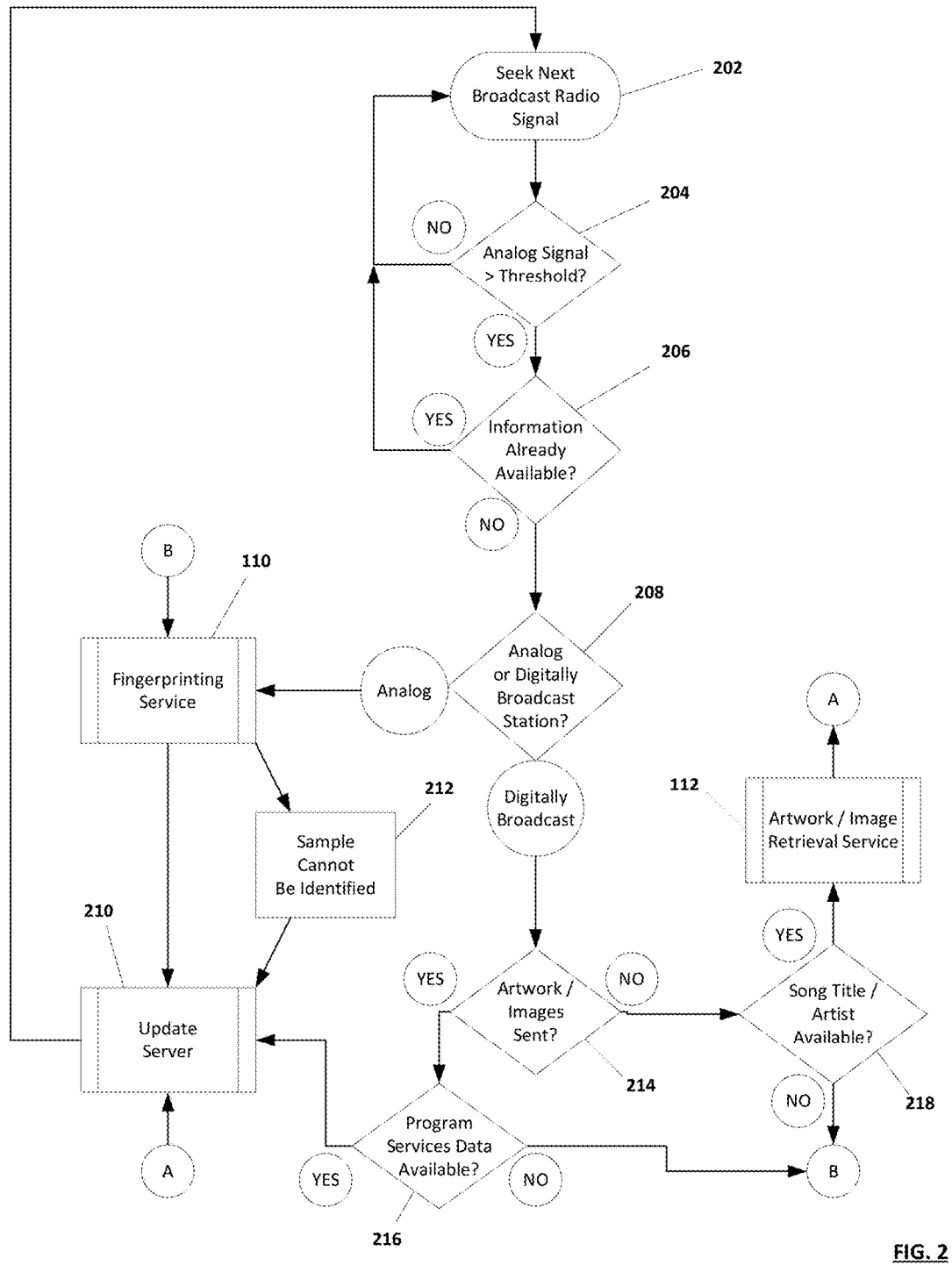
FIG. 2 is a process flow diagram illustrating an example of processing broadcast radio signals and music-related content.

With reference to FIGS. 1 and 2, which illustrate examples of certain aspects of different embodiments of the invention, a method and apparatus can be provided for processing collecting music-related broadcast radio data within a given area or market of interest. FIG. 1 illustrates an example of a computer environment and architecture including a radio station broadcast signal identification apparatus 102 in operative association with a digital broadcast radio processing system 104. FIG. 2 illustrates an example of a process which can be executed cooperatively by the apparatus 102 and the system 104.

In the example shown in FIG. 1, the radio station broadcast signal identification apparatus 102 may include a plurality of tuners 102A-102J, each of which may be programmed for detecting broadcast radio signals at a predetermined frequency or within a defined frequency range. For example, tuner 102A may be programmed to detect broadcast radio signals within a frequency range starting at 87.9 MHz. In certain embodiments, one or more of the tuners 102A-102J may be programmed to detect signals at or above a threshold signal strength (e.g., 30 dBuv). It can be appreciated that more or less than the number of tuners 102A-102J shown can be employed within the scope of the invention. For example, in a metropolitan area with comparatively more radio stations broadcasting in the area of interest, the number of tuners 102A-102J could be increased accordingly. In one embodiment, the tuner may be a trade-designated "SiLabs 4622" component, for example. The apparatus 102 may include an expansion connector 102K for facilitating the addition or removal of one or more tuners 102A-102J from the apparatus 102, for example. A network adapter 102L may be provided as a component programmed for communicating over various communication media 106 such as a wireless or wired network connection. The network adapter 102L enables the apparatus 102 to communicate with other computer systems, such as the broadcast radio processing system 104. The apparatus 102 may also include a unit controller 102M programmed for directing various computer-based tasks or executing various instructions within the apparatus 102.

In the example shown, the digital broadcast radio processing system 104 includes one or more electronic computer processors 104A (e.g., servers) configured and programmed to perform various tasks and execute different kinds of computer-readable instructions within the system 104. In operation, the processor 104A may access a plurality of modules 104B-104E, which can be configured for specific tasks or functions performed by the system 104. In other aspects, one or more kinds of data storage media 104F may be provided in the system 104 to store data, documents, text files, analysis results, or a variety of other kinds of data and information related to broadcast radio signals. For example, a music guide generation module 104B may be programmed for generating a list or guide of available music programming selections available within a predetermined area or market of interest. The guide may include a variety of music-related information such as artist name, song title, album title, album artwork, or other data. The user communication module 104C may be configured for communicating data to one or more user access devices 108 through different types of communication media 106. Examples of user access devices 108 include radios, radio players, mobile devices, and many other kinds of computers or computing apparatus. In one embodiment, the user access device 108 may be equipped for accessing and communicating an "FM+" software application. A fingerprint processing module 104D may be programmed to communicate with one or more fingerprinting services 110. It can be appreciated that the fingerprinting service 110 can be accessed to identify data associated with an audio snippet or other types of broadcast samples. In certain embodiments, one or more other kinds of modules 104E may be provided, such as to receive data from an artwork or image retrieval service 112 to furnish image-related elements missing from certain music-related data, for example.

FIG. 2 illustrates a method for collecting music-related radio broadcast data which can be executed in connection with the apparatus 102 and system 104 shown in FIG. 1. As a preliminary part of the process, an area or market of interest can be selected, such as a certain geographical area or metropolitan area surrounding a city, for example. At step 202, the apparatus 104 can direct an appropriate tuner 102A-102J to identify a radio station broadcast signal at a predetermined frequency and perhaps at a threshold signal level (which can be detected at step 204). At step 206, the process determines whether information associated with a detected broadcast signal is available through an existing source. For example, if the detected broadcast signal originates from a station directly supplying content related information, then the apparatus 102 can determine that music-related information is already available for that broadcast signal, and processing can return to step 202 to detect another broadcast signal at a new frequency. As described below, the process may involve collecting one or more broadcast samples from each radio station associated with each broadcast radio signal. Such broadcast samples may be audio snippets or digital signal decodes processed and decoded by the apparatus 102, for example.

At step 208, the process can identify the radio station associated with the broadcast radio signal as an analog station or a digitally broadcast station in response to the radio station signal. When the radio station is identified as an analog station, the process may involve obtaining an audio snippet from the radio station, communicating the audio snippet to the fingerprinting service 110, and then updating data records 104F of the system 104 at step 210 with data received from the fingerprinting service 110 which is associated with the obtained audio snippet. Such data may include missing elements of music-related content, such as song title, artist name, album name, for example. At step 212, it may be determined that the audio snippet cannot be identified, and the system 104 can be updated accordingly at step 210.

At step 208, the process may identify the radio station associated with the broadcast radio signal as a digitally broadcast station. In this situation, the process may involve the apparatus 102 obtaining a digital signal decode from the digitally broadcast station. At step 214, the process determines whether the digital signal decode comprises at least one image or artwork. If the digital signal decode comprises at least one image or artwork (as determined at step 214), and if program services data associated with the broadcast signal are available (as determined at step 216), then the system 104 can be updated accordingly at step 210. Program services data as applied herein may include information such as music title, artist, album name, and other like data. If the digital signal decode comprises at least one image or artwork (as determined at step 214), and if program services data associated with the broadcast signal are not available (as determined at step 216), then the process may involve: obtaining an audio snippet from the radio station, communicating the audio snippet to the fingerprinting service 110, and updating data records 104F of the system 104 at step 210 with retrieved data associated with the obtained audio snippet.

At step 214, when the digital signal decode does not comprise at least one image, the process can determine at step 218 whether the digital signal decode includes at least one song title or at least one piece of artist-related data. When the digital signal decode does include at least one song title or at least one piece of artist-related data, then program services data associated with the digital signal decode can be communicated to an image retrieval service 112, and data records 104F of the system 104 can be updated at step 210 with data obtained from the image retrieval service 112. When the digital signal decode does not include at least one song title or at least one piece of artist-related data, then the process may involve: obtaining an audio snippet from the radio station, communicating the audio snippet to the fingerprinting service 110, and updating data records 104F of the system 104 at step 210 with data associated with the obtained audio snippet retrieved from the fingerprinting service 110.

At step 210, after appropriate updates to the data records 104F of the system 104 have been made, the process could in certain embodiments dwell on a current station or frequency and wait for content to change. In other embodiments, the process can seek the next broadcast signal or a different frequency, perhaps by using a different tuner 102A-102J of the apparatus 102.

Figure 3:
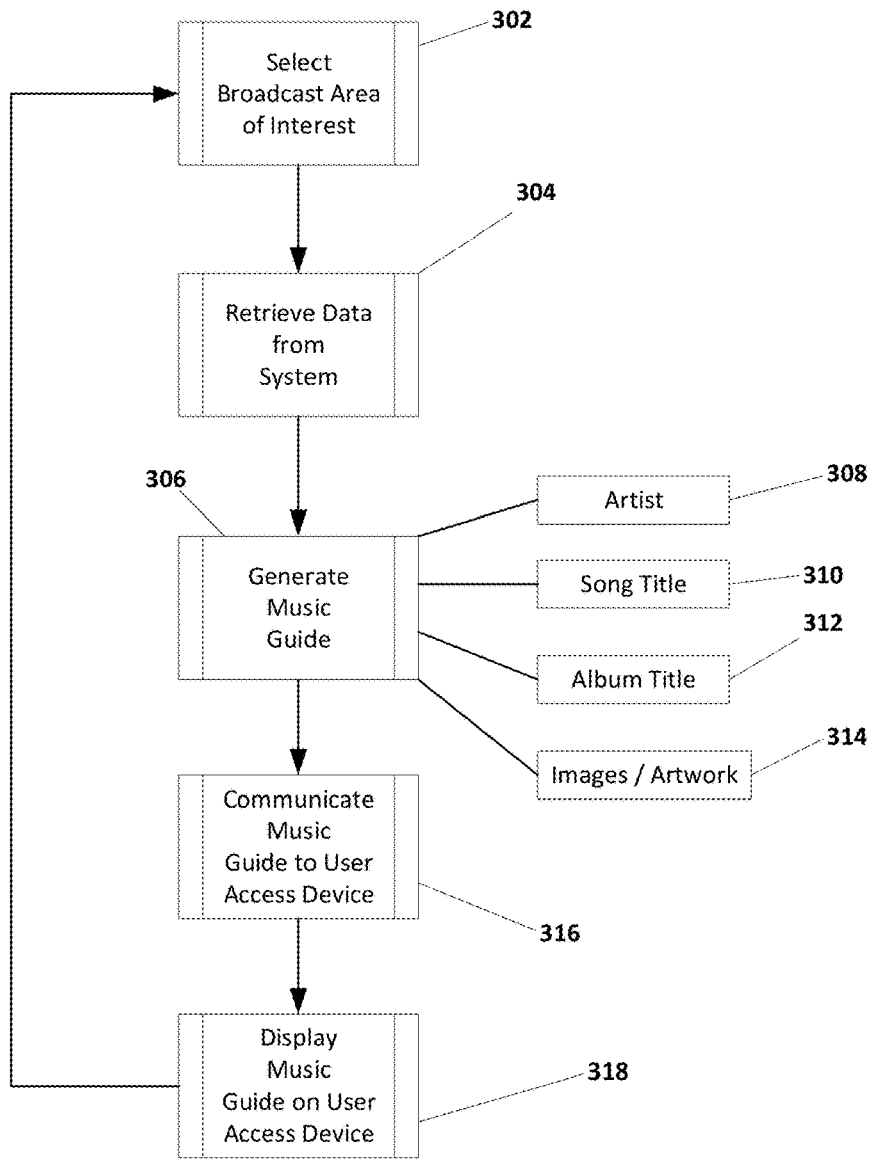
FIG. 3 is a process flow diagram illustrating an example of generating a music guide.

FIG. 3 illustrates an example of one embodiment of a process for generating and displaying a music guide in accordance with certain embodiments of the invention. At step 302, an area or market of interest can be selected, such as a certain geographical area or metropolitan area surrounding a city, for example. At step 304, data stored within the digital broadcast radio processing system 104 can be retrieved, and a music guide can be generated at step 306 including a list of available song selections, for example. At least a portion of the data retrieved from the system 104 may be the direct result of the operation of the apparatus 102 to retrieve missing data elements in connection with various detected broadcast radio signals. The retrieved data may include artist name 308, song titles 310, album titles 312, or images or artwork 314, in the example shown. At step 316, the generated music guide may be communicated to one or more user access devices 108. The music guide may be generated in response to the area of interest selected at step 302, and then displayed on the user access device 108 at step 318.

Various embodiments of the present invention employ hardware, software, and other components for supplying advanced application services ("AAS"). A "service" can be considered content that is delivered to users via an IBOC broadcast signal which can include various types of data not classified as main program service ("MPS") data or supplemental program service ("SPS") data. Examples of AAS data include real-time traffic and weather information, navigation map updates or other images, electronic program guides, multicast programming, multimedia programming, other audio services, and other content. The content for AAS can be supplied by service providers which provide service data to an importer, for example. The service providers may be broadcasters located at studio sites, for example, or externally sourced third-party providers of services and content.

Figure 4:
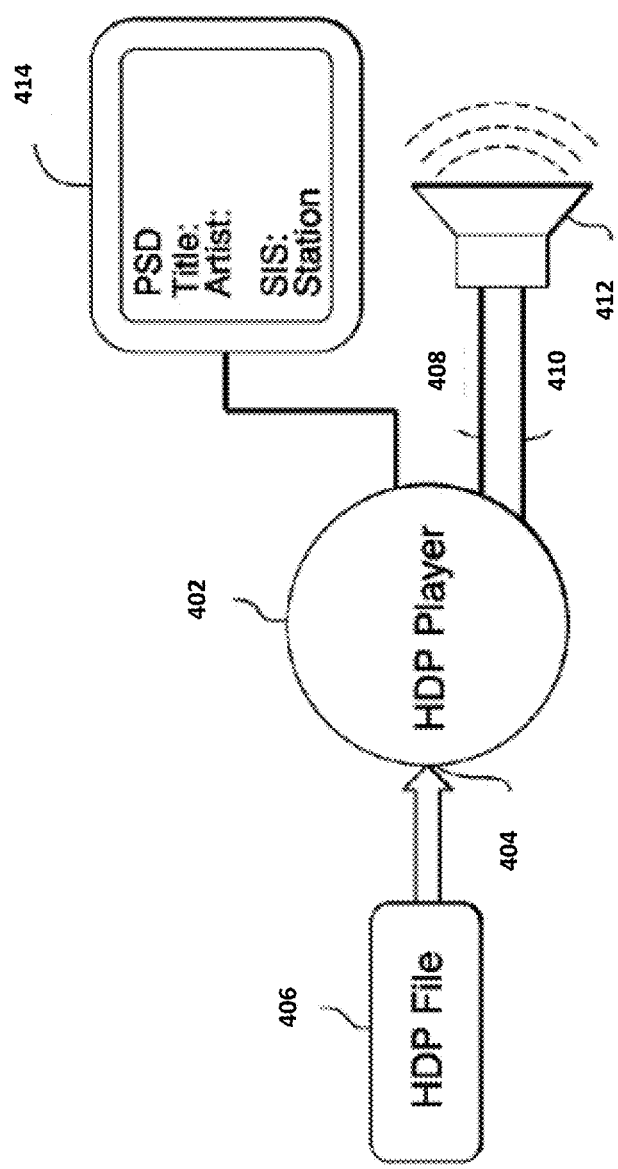
FIG. 4 is a block diagram illustrating an example of an "HD Radio" player which can be employed in connection with certain embodiments of the invention.

FIG. 4 is a block diagram illustrating an example of an "HD Radio" player 402. The player 402 includes an input 404 configured to receive data 406 formatted in accordance with the "HD Radio" protocol as described in U.S. Pat. No. 9,118,430, for example, which is incorporated herein by reference. The data 406 can be taken from Layer 2 (i.e., the multiplex layer) of the layered processing in an "HD Radio" broadcast. The layered signal processing used in "HD Radio" transmitters is described in U.S. Pat. No. 8,041,292, for example, which is hereby incorporated by reference. The player 402 includes processing circuitry that decodes the "HD Radio" protocol input data 406 to produce an audio signal on lines 408, 410 that is used to produce an audio output from a transducer, such as a speaker 412. The processing circuitry can also produce information that can be shown on a user display or graphical user interface 414. In addition, the processing circuitry can receive user input from the graphical user interface 414, and respond to that user input, for example by extracting user requested information from the input data.

FIG. 5 is an example of a music guide screen 502 that may be presented on the graphical user interface 414 for a hybrid radio player. In this embodiment, the interface is configured to display data such as radio station call letters; radio station slogans; radio station logos; current song title and artist information; a news stream; and a plurality of buttons that allow the user to select a different HD sub channel; to tag the received content; to request traffic information; to request weather information; and to request gas prices. When the user presses one of these buttons, the processing circuitry retrieves the requested content or information from the received data and produces an appropriate output for the speaker and/or user interface, based on the requested content.

FIG. 6 is a schematic diagram illustrating one example of a system architecture configured for delivering content to a radio system installed in a vehicle 602, for example. It can be seen that this architecture can provide the significant benefit of needing to communicate only content related metadata over the Internet, while in parallel a digital radio bit stream and/or other communications (e.g., analog audio, digital audio, data, SIS, PSD, AE, EA, or others) can be transmitted and received from local transmitters of a radio station 604, for example. FIG. 6 depicts an example of an "in car" system that can process OTA (over the air) audio/data, supplemented by Internet protocol (IP) data received from the operation of the radio station broadcast signal identification apparatus 102 in connection with the digital broadcast radio processing system 104. The processing system 104 may communicate with the vehicle 602, and a radio system 608 installed in the vehicle 602, through various kinds of communication media 106, as described above.

In the example shown, the radio system 608 may be a component of an "infotainment" system 610 installed within the vehicle 602 which can be programmed to provide both informational and entertainment based content, for example, such as music-related content. The system 610 may include computer-readable instructions such as middleware 612 programmed to employ application program interfaces (API's) and other software. For example, the middleware 612 may be programmed to decide where to source data (e.g., OTA or IP data) within the system 610, to decide what data or information to present to users of the system 610, and/or to execute other tasks.

In various embodiments, the system 610 may be configured to interact or collaborate with other components installed on the vehicle 602. For example, a telematics control unit 614 may communicate with the system 610, and the unit 614 may include a built-in modem and/or may possess "WiFi" or "Bluetooth" connectivity. A global positioning system (GPS) 616 may communicate information to the system 610, such as latitude or longitude information associated with the current position of the vehicle 602. In addition, various displays, touchscreens, or other types of user interfaces 618 may be provided to allow a user to access the functionality of the system 610.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, configurations, data definitions, or process flows described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that a sufficient understanding of the present invention can be gained by the present disclosure, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, various models or platforms can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as a computer system (non-volatile) memory. Furthermore, some of the processes may be programmed when the computer system is manufactured or via a computer-readable memory storage medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. Memory and/or storage components may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

A "computer," "computer system," "computing apparatus," "component," or "computer processor" may be, for example and without limitation, a processor, microcomputer, minicomputer, server, mainframe, laptop, personal data assistant (PDA), wireless e-mail device, smart phone, mobile phone, electronic tablet, cellular phone, pager, fax machine, scanner, or any other programmable device or computer apparatus configured to transmit, process, and/or receive data. Computer systems and computer-based devices disclosed herein may include memory and/or storage components for storing certain software applications used in obtaining, processing, and communicating information. It can be appreciated that such memory may be internal or external with respect to operation of the disclosed embodiments. In various embodiments, a "host," "engine," "loader," "filter," "platform," or "component" may include various computers or computer systems, or may include a reasonable combination of software, firmware, and/or hardware. In certain embodiments, a "module" may include software, firmware, hardware, or any reasonable combination thereof.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties. The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

Although some embodiments may be illustrated and described as comprising functional components, software, engines, and/or modules performing various operations, it can be appreciated that such components or modules may be implemented by one or more hardware components, software components, and/or combination thereof. The functional components, software, engines, and/or modules may be implemented, for example, by logic (e.g., instructions, data, and/or code) to be executed by a logic device (e.g., processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Additionally, it is to be appreciated that the embodiments described herein illustrate example implementations, and that the functional elements, logical blocks, modules, and circuits elements may be implemented in various other ways which are consistent with the described embodiments. Furthermore, the operations performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible.

Unless specifically stated otherwise, terms such as "processing," "computing," "calculating," "determining," "identifying," or the like, may refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

Certain embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and are comprised within the scope thereof. Furthermore, all examples and conditional language recited herein are principally intended to aid the reader in understanding the principles described in the present disclosure and the concepts contributed to furthering the art, and are to be construed as being without limitation to such specifically recited examples and conditions. Moreover, all statements herein reciting principles, aspects, and embodiments as well as specific examples thereof, are intended to encompass both structural and functional equivalents thereof. Additionally, it is intended that such equivalents comprise both currently known equivalents and equivalents developed in the future, i.e., any elements developed that perform the same function, regardless of structure. The scope of the present disclosure, therefore, is not intended to be limited to the exemplary aspects and aspects shown and described herein.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein.

The flow charts and methods described herein show the functionality and operation of various implementations. If embodied in software, each block, step, or action may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flow charts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Reference to "one embodiment" or "an embodiment" means that a particular feature, structure, or characteristic described in connection with the embodiment is comprised in at least one embodiment. The appearances of the phrase "in one embodiment" or "in one aspect" in the specification are not necessarily all referring to the same embodiment. The terms "a" and "an" and "the" and similar referents used in the context of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as," "in the case," "by way of example") provided herein is intended merely to better illuminate the disclosed embodiments and does not pose a limitation on the scope otherwise claimed. No language in the specification should be construed as indicating any non-claimed element essential to the practice of the claimed subject matter. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or embodiments disclosed herein are not to be construed as limitations. Each group member may be referred to and claimed individually or in any combination with other members of the group or other elements found herein. It is anticipated that one or more members of a group may be comprised in, or deleted from, a group for reasons of convenience and/or patentability.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as claimed herein.

The invention claimed is:

1. A method for processing music-related broadcast radio data, the method comprising:
   receiving, with multiple tuners, a plurality of broadcast radio signals each at a predetermined frequency and a threshold signal level;
   identifying each broadcast radio signal as an analog signal or a digitally broadcast signal associated with a radio station;
   obtaining a broadcast sample of a broadcast radio signal from at least one of the radio stations;
   identifying at least one music-related information element missing from the broadcast sample of the broadcast radio signal;
   initiating retrieval of at least one of the missing music-related information elements from at least one data external source in response to the identifying the at least one music-related information element missing from the broadcast sample of the broadcast radio signal;
   sending a first type of data or a second type of data included in the broadcast sample to the at least one external data source according to whether the broadcast radio signal is an analog radio broadcast signal or a digital broadcast radio signal and according to the type of music-related information element identified as missing from the radio broadcast signal;
   obtaining the at least one of the missing music-related information elements from at least one data external source; and,
   updating a data storage medium of a computer system with the obtained music-related information elements.

2. The method of claim 1; further comprising generating a music guide in response to at least a portion of the obtained music-related information elements.

3. The method of claim 2; further comprising communicating the generated music guide to at least one user access device.

4. The method of claim 1, wherein the music-related information includes at least one of an artist name, a song title, an album title, or an image.

5. The method of claim 1, further comprising compiling the obtained music-related information in response to a selected area of interest.

6. The method of claim 5; further comprising generating a music guide in response to the compiled music-related information.

7. The method of claim 1, further comprising selecting a radio broadcast area of interest and receiving the plurality of broadcast radio signals within the selected area of interest.

8. A method for processing music-related radio broadcast data, the method comprising:
   identifying, with a tuner, a broadcast radio signal at a predetermined frequency and a threshold signal level; and
   identifying a radio station associated with the broadcast radio signal as an analog station or a digitally broadcast station, wherein:
      in response to the radio station identified as an analog station:
         obtaining an audio snippet from the radio station,
         communicating the audio snippet to a fingerprinting service, and
         updating a server with data associated with the audio snippet received from the fingerprinting service; and in response to the radio station identified as a digitally broadcast station:
         obtaining a digital signal decode of the broadcast radio signal from the radio station,
         when the digital signal decode comprises at least one image, and program services data are available for the digital signal decode; updating the server with data associated with the digital signal decode,
         when the digital signal decode comprises at least one image, and program services data are not available for the digital signal decode, obtaining an audio snippet from the radio station, communicating the audio snippet to the fingerprinting service, and updating the server with data associated with the audio snippet received from the fingerprinting service, when the digital signal decode does not comprise at least one image, and
         when the digital signal decode includes at least one song title or at least one piece of artist-related data, communicating the digital signal decode to an image retrieval service, and updating the server with data associated with the digital signal decode received from the image retrieval service, and
         when the digital signal decode does not comprise at least one image and does not include at least one song title or at least one piece of artist-related data, communicating the digital signal decode to an image retrieval service, and updating the server with data associated with the digital signal decode received from the image retrieval service, obtaining an audio snippet from the radio station, communicating the audio snippet to the fingerprinting service, and updating the server with data associated with the audio snippet received from the fingerprinting service.

9. The method of claim 8, further comprising:
   identifying, with a second tuner, a second broadcast radio signal at a predetermined frequency and a threshold signal level; and
   identifying a second radio station associated with the second broadcast radio signal as an analog station or a digitally broadcast station, wherein:
      when the second radio station is identified as an analog station:
         obtaining an audio snippet from the second radio station,
         communicating the audio snippet to the fingerprinting service, and
         updating the server with data associated with the audio snippet received from the fingerprinting service, when the second radio station is identified as a digitally broadcast station:
         obtaining a digital signal decode from the second radio station, when the digital signal decode comprises at least one image, and program services data are available for the digital signal decode, updating the server with data associated with the digital signal decode, when the digital signal decode comprises at least one image, and program services data are not available for the digital signal decode, obtaining an audio snippet from the second radio station, communicating the audio snippet to the fingerprinting service, and updating the server with data associated with the audio snippet received from the fingerprinting service, when the digital signal decode does not comprise at least one image, and when the digital signal decode includes at least one song title or at least one piece of artist-related data, communicating the digital signal decode to an image retrieval service, and updating the server with data associated with the digital signal decode received from the image retrieval service, and when the digital signal decode does not comprise at least one image and does not include at least one song title or at least one piece of artist-related data, communicating the digital signal decode to an image retrieval service, and updating the server with data associated with the digital signal decode received from the image retrieval service, obtaining an audio snippet from the second radio station, communicating the audio snippet to the fingerprinting service, and updating the server with data associated with the audio snippet received from the fingerprinting service.

10. The method of claim 9, further comprising generating a music guide in response to at least a portion of the updated server data.

11. The method of claim 10, further comprising communicating the generated music guide to at least one user access device.

12. The method of claim 8; further comprising identifying at least one of the broadcast radio signals within a predetermined area of interest.

13. An apparatus for processing music-related broadcast radio data, the apparatus comprising:

a plurality of tuners each programmed for receiving a broadcast radio signal at a predetermined frequency and a threshold signal level; and a controller programmed for:

identifying received broadcast radio signals as an analog radio station signal or a digitally broadcast radio station signal;

obtaining a broadcast sample from at least one of the broadcast radio signals, identifying at least one music-related information element missing from the broadcast sample of the at least one of the broadcast radio signals, initiating retrieval of at least one of the missing music-related information elements from at least one data external source in response to the identifying the at least one music-related information element missing from the broadcast sample of the broadcast radio signal, sending a first type of data or a second type of data included in the broadcast sample to the at least one external data source according to whether the broadcast radio signal is an analog radio broadcast signal or a digital broadcast radio signal and according to the type of music-related information element identified as missing from the radio broadcast signal, obtaining at least one of the missing music-related information elements from at least one data external source, and, communicating data to a computer server in association with the obtained music-related information elements.

14. A system for processing music-related broadcast radio data, the system comprising:

an apparatus comprising:

a plurality of tuners each programmed for receiving a broadcast radio signal at a predetermined frequency and a threshold signal level; and a controller programmed for:

identifying received broadcast radio signals as an analog radio station signal or a digitally broadcast radio station signal, obtaining a broadcast sample from at least one of the broadcast radio signals, identifying at least one music-related information element missing from the broadcast sample of the at least one of the broadcast radio signals; and, a computer system programmed for:

initiating retrieval of at least one of the missing music-related information elements from at least one data external source in response to the identifying the at least one music-related information element missing from the broadcast sample of the broadcast radio signal, sending a first type of data or a second type of data included in the broadcast sample to the at least one external data source according to whether the broadcast radio signal is an analog radio broadcast signal or a digital broadcast radio signal and according to the type of music-related information element identified as missing from the radio broadcast signal, obtaining at least one of the missing music-related information elements from at least one data external source, and receiving updated data in association with the obtained music-related information elements.

15. The system of claim 14, further comprising the computer system programmed for generating a music guide in response to at least a portion of the obtained music-related information elements.

16. The system of claim 15, further comprising the computer system programmed for communicating the generated music guide to at least one user access device.

17. The system of claim 14, wherein the music-related information includes at least one of an artist name, a song title, an album title, or an image.

18. The system of claim 14, further comprising the computer system programmed for compiling the obtained music-related information in response to the selected area of interest.

19. The system of claim 18, further comprising the computer system programmed for generating a music guide in response to the compiled music-related information.

20. The apparatus of claim 13, wherein the controller is programmed for:

communicating an audio snippet of the broadcast radio signal to the at least one data external source when the broadcast radio signal is an analog radio station signal; and communicating program services data of the broadcast radio signal to the at least one data external source when the broadcast radio signal includes a digitally broadcast radio station signal and image data is missing from the broadcast sample of the digitally broadcast radio station signal.

* * * * *